Nov. 8, 1927.
F. SCHÄFER
1,648,152
SEALING DEVICE FOR BOX FASTENERS
Filed Dec. 6, 1926
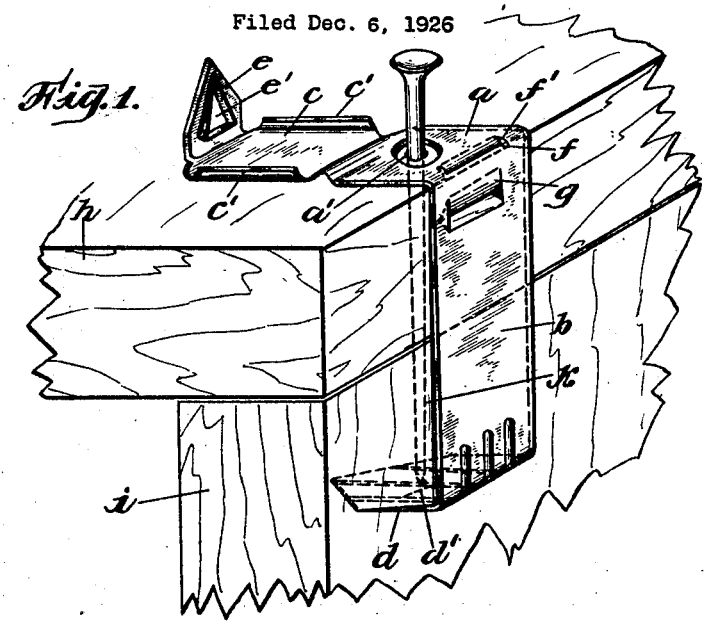
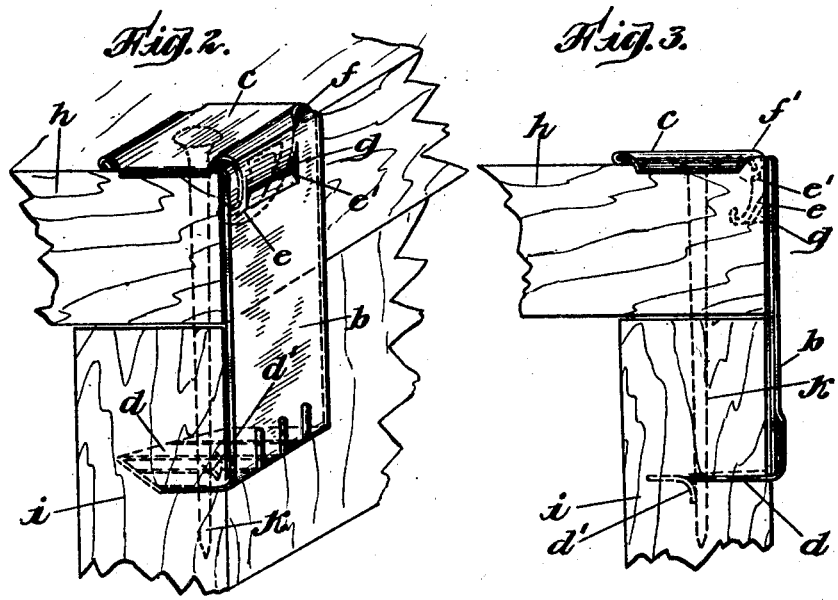
Inventor
Friedrich Schäfer
By his Attorneys
Redding, Greeley, Olsen & Campbell Patented Nov. 8, 1927.

1,648,152

UNITED STATES PATENT OFFICE.

FRIEDRICH SCHÄFER, OF ST. GALL, SWITZERLAND.

SEALING DEVICE FOR BOX FASTENERS.

Application filed December 6, 1926, Serial No. 152,734, and in Germany June 3, 1926.

This invention relates to sheet metal devices such as are sometimes employed to cover the heads of nails or screws used in securing together the parts of wooden boxes or packing cases so that such nails or screws cannot be withdrawn without so mutilating the sealing devices as to disclose the fact of unauthorized opening. Such a device has sometimes comprised a sheet metal member adapted to be secured to the box or case at its edge and having a flap which, after the nail or screw has been driven home through the main body of the sealing device, is bent over the head of the nail or screw and is then secured to such main body by solder, so that the head of the nail or screw is not thereafter accessible for removal of the nail or screw without destruction or such mutilation of the sealing devices as will disclose an unauthorized opening. Such soldering requires a special operation, which involves expense, and moreover a device of this kind does not always accomplish its purpose, because it is possible to melt the solder, turn back the flap, withdraw the nail or screw, replace it and again solder the flap over the head of the nail or screw, without leaving any mark of unauthorized opening. It is the object of this invention to provide a sealing device of this general character which shall avoid the objections due to the use of solder and so effectually seal the head of the nail or screw that it is impossible to remove the sealing device without mutilating it. In accordance with the invention, the sealing device is so constructed that when applied it is engaged with the wood of the box or case in such manner that it cannot be removed without permanent mutilation. The improved device is inexpensive in manufacture and can be applied with the aid of no other appliance than an ordinary hammer.

The invention will be more fully explained hereinafter with reference to the accompanying drawing in which it is illustrated and in which:

Figure 1 is a view in perspective showing a portion of a box or packing case with a nail partly driven home and the improved sealing device in an intermediate stage of application.

Figure 2 is a view generally similar to Figure 1 but showing, in broken lines, the nail driven home and the sealing device in its final stage of application.

Figure 3 is a view in end elevation of the parts as shown in Figure 2, but exhibiting somewhat more clearly the engagement of the sealing device with the box.

The main body $a$, $b$, of the sheet metal sealing device is bent at a right angle between the parts $a$ and $b$ so as to fit upon the box at its edge, the part $a$, for example, overlapping the box cover $h$, while the part $b$ is long enough to extend across the edge of the box cover $h$ and to overlap the box wall $i$. The part $b$ is provided with a pointed extension $d$ which may be driven into the box member $i$ and the extension $d$ is formed with a tongue $d'$ which is forced into the wood by the nail or screw $k$, when it is driven home, so that the pointed extension $d$ cannot be withdrawn from the wood.

The part $a$ of the main body is formed with a flap $c$ of substantially the same dimensions as itself so that, when bent over, as shown in Figures 2 and 3, it will substantially cover the part $a$, the flap $c$ being preferably formed at its lateral edges with lips $c'$ which will be driven down into the wood when the flap has been bent over, as shown in Figures 2 and 3. The flap $c$ is further provided at its free end with a sharpened extension $e$, which is also formed with a tongue $e'$ for engagement with the wood of the box, as hereinafter described. The main body $a$, $b$, is formed, preferably at the angle between the two parts, with a slit $f$, the lip $f'$, formed by the slit and the cuts at the ends thereof, being preferably bent inward. The part $b$ is preferably formed on its rear or inner face with an inwardly projecting rib $g$.

In the application of the improved sealing device, when it has been bent to the form shown in Figure 1 and placed on the edge of the box or case as shown, the sharpened extension $d$ is driven into the wood of the box wall and the fastening device, which may be a nail or screw, is driven home through the body part $a$ and the extension $d$, the body part $a$ being preferably formed with an aperture at $a'$ in alignment with the tongue $d'$. This action bends the tongue $d'$, as shown in Figures 2 and 3, so that the withdrawal of the extension $d$ is prevented. The flap $c$ is then bent over upon the body part *a*, covering the head of the nail or screw. In this action the sharpened extension *e* is caused to enter the slit *f* and is driven home by a blow of a hammer and as its point meets the inwardly projecting lip it is deflected, somewhat as indicated by broken lines in Figures 2 and 3, and is thereby securely anchored in the wood. The shoulder formed by the cut end of the tongue *d'* slips by the edge of the lip *f'* and thereafter engages the edge of the lip, thereby still further preventing the withdrawal of the extension.

By the described construction, as will now be clearly understood, the head of the nail or screw is covered in such manner that the nail or screw cannot be withdrawn without so mutilating the sealing device as to disclose the fact that it has been tampered with.

I claim as my invention:

1. A sealing device for a nail or screw used in securing together the parts of a box or case, such sealing device comprising a sheet metal body adapted to be engaged with the box or case and overlying the edge thereof and formed with a flap to cover the head of the nail or screw, such flap being formed with an extension for mechanical engagement with the material of the box or case, whereby the head of the nail or screw cannot be uncovered without mutilation of the sealing device.

2. A sealing device as covered by claim 1 and in which the body of the sealing device is formed with a slit through which the extension of the flap may be driven into engagement with the material of the box or case.

3. A sealing device as covered by claim 1 and in which the body of the sealing device is formed with a slit through which the extension of the flap may be driven into engagement with the material of the box or case, and in which the body is also formed on its inner face with a projecting lip by which the extension of the flap shall be deflected and engaged with the material of the box or case.

4. A sealing device as covered by claim 1 and in which the sealing device is formed with a slit through which the extension of the flap may be driven into engagement with the material of the box or case and is formed at the slit with an inwardly projecting lip and the flap is formed with a projecting tongue for engagement therewith.

This specification signed this 17 day of November, A. D. 1926.

FRIEDRICH SCHÄFER.